United States Patent [19]
Becerra

[11] Patent Number: 5,994,869
[45] Date of Patent: Nov. 30, 1999

[54] POWER CONVERSION CIRCUIT FOR A MOTOR

[75] Inventor: Roger C. Becerra, Fort Wayne, Ind.

[73] Assignee: General Electric Company, Schenectady, N.Y.

[21] Appl. No.: 08/985,503

[22] Filed: Dec. 5, 1997

[51] Int. Cl.[6] .................................................. H02P 1/24
[52] U.S. Cl. ............................................. 318/729; 363/56
[58] Field of Search .................................... 318/257, 268, 318/432, 433, 434, 438, 729; 323/205, 207, 208; 363/34, 35, 37, 45, 48

[56] References Cited

U.S. PATENT DOCUMENTS

| | | | |
|---|---|---|---|
| Re. 33,655 | 8/1991 | Hershberger | 68/23.7 |
| 4,390,826 | 6/1983 | Erdman et al. | 318/439 |
| 4,449,079 | 5/1984 | Erdman | 318/138 |
| 4,513,230 | 4/1985 | Erdman | 318/254 |
| 4,532,459 | 7/1985 | Erdman et al. | 318/138 |
| 4,556,827 | 12/1985 | Erdman | 318/254 |
| 4,672,522 | 6/1987 | Lesea | 363/48 |
| 4,720,668 | 1/1988 | Lee et al. | 323/271 |
| 4,757,241 | 7/1988 | Young | 318/254 |
| 4,757,603 | 7/1988 | Stokes | 29/598 |
| 4,922,172 | 5/1990 | Roddy et al. | 318/490 |
| 4,933,584 | 6/1990 | Harms et al. | 310/162 |
| 5,115,181 | 5/1992 | Sood | 318/701 |
| 5,235,504 | 8/1993 | Sood | 363/53 |
| 5,418,438 | 5/1995 | Hollenbeck | 318/432 |
| 5,423,192 | 6/1995 | Young et al. | 62/228.4 |
| 5,448,141 | 9/1995 | Kelley et al. | 318/254 |
| 5,465,019 | 11/1995 | Kliman | 310/156 |
| 5,491,978 | 2/1996 | Young et al. | 62/126 |
| 5,492,273 | 2/1996 | Shah | 236/44 A |
| 5,506,487 | 4/1996 | Young et al. | 318/811 |
| 5,513,058 | 4/1996 | Hollenbeck | 361/36 |
| 5,592,058 | 1/1997 | Archer et al. | 318/254 |
| 5,663,927 | 9/1997 | Ogawa | 363/37 |
| 5,712,536 | 1/1998 | Haas et al. | 363/37 |
| 5,793,623 | 8/1998 | Kawashima | 363/45 |

FOREIGN PATENT DOCUMENTS

| | | | |
|---|---|---|---|
| 0 688 091 A1 | 5/1995 | European Pat. Off. | H02K 29/08 |
| 1259427 | 9/1986 | U.S.S.R. | H02K 29/00 |

*Primary Examiner*—William M. Shoop, Jr.
*Assistant Examiner*—Rina I. Duda
*Attorney, Agent, or Firm*—Senniger, Powers, Leavitt & Roedel; Wayne O. Traynham

[57] ABSTRACT

A motor system and method providing improved power factor and harmonic control of power supplied to a motor. The system and method employs a power conversion circuit connected to an AC voltage source for supplying power to a power supply link of the motor. The power conversion circuit includes a rectifier circuit and a power factor correction circuit. The rectifier circuit rectifies the AC voltage and has first and second outputs corresponding to upper and lower rails of the power supply link, respectively. The power factor correction circuit is connected directly between the first output of the rectifier circuit and a node of the corresponding upper rail of the power supply link for improving the power factor of the power supplied to the motor.

14 Claims, 7 Drawing Sheets

POWER CONVERSION CIRCUIT FOR A MOTOR

BACKGROUND OF THE INVENTION

This invention relates generally to motor systems and, particularly, to a power conversion circuit for an electronically controlled motor providing passive power factor correction and harmonic control.

Presently available power supply circuits provide a DC voltage, rectified from an AC source, for powering loads such as a voltage source inverter drive for a brushless DC motor. Typically, a diode bridge rectifier rectifies the AC source voltage and a DC link capacitor provides energy storage for reducing ripple in the rectified voltage. The load, connected across the DC link, is a single or multi-phase electronically commutated motor powered by an inverter bridge, for example.

The power supply circuits known in the art are deficient for several reasons. A soft or hard switching converter may be used, rather than a passive circuit, for improving power factor but such a converter has switching losses associated with it. Other conventional power supply circuits provide power factor correction but do not reduce the level of harmonics in the input current to an acceptable level. In addition, presently available power factor correction circuits for use with a power supply are not easily retrofitted or installed in the DC link of an existing motor.

In general, brushless DC motors are disclosed in, for example, U.S. Pat. Nos. 5,592,058, 5,506,487, 5,491,978, 5,465,019, 5,423,192, 4,933,584 and 4,757,241, all of which are commonly assigned with the present invention described herein and the entire disclosures of which are incorporated herein by reference.

SUMMARY OF THE INVENTION

The invention meets the above needs and overcomes the deficiencies of the prior art by providing a motor system which has a controlled input current. This is accomplished by a power conversion circuit for rectifying and filtering AC voltage to supply power to the motor load. The power conversion circuit of the invention provides passive power factor correction and reduces the harmonics of the power supplied to the load. In addition, the power conversioin circuit is easily implemented, economically feasible and commercially practical.

Briefly described, a motor system embodying aspects of the invention includes a stationary assembly with a winding in magnetic coupling relation to a rotatable assembly. A power supply link having upper and lower rails supplies power to the winding. The motor system includes a power supply circuit connected to an AC voltage source for supplying power to the power supply link. The power supply circuit includes a rectifier circuit and a power factor correction circuit. The rectifier circuit rectifies the AC voltage and has first and second outputs corresponding to the upper and lower rails of the power supply link, respectively. The power factor correction circuit is connected between the first output of the rectifier circuit and the corresponding upper rail of the power supply link for improving the power factor of the power supplied to the winding.

Another embodiment of the invention is directed to a power supply circuit for a motor. The motor has a stationary assembly with a winding in magnetic coupling relation to a rotatable assembly. A power supply link having upper and lower rails supplies power to the winding. The power supply circuit has a pair of leads for connecting it to an AC voltage source to supply power to the power supply link. The power supply circuit also includes a rectifier circuit and a power factor correction circuit. The rectifier circuit rectifies the AC voltage and has first and second outputs corresponding to the upper and lower rails of the power supply link, respectively. The power factor correction circuit is connected between the first output of the rectifier circuit and the corresponding upper rail of the power supply link for improving the power factor of the power supplied to the winding.

In another form, the invention is directed to a method of improving power factor and controlling harmonic content of power supplied to a motor. The motor has a stationary assembly with a winding in magnetic coupling relation to a rotatable assembly. A power supply link having upper and lower rails supplies power to the winding. The method includes the step of rectifying an AC voltage supplied to the power supply link with a rectifier circuit. The rectifier circuit has first and second outputs corresponding to the upper and lower rails of the power supply link, respectively. The method also includes connecting a power factor correction circuit between the first output of the rectifier circuit and the corresponding upper rail of the power supply link for improving the power factor of the power supplied to the winding.

Alternatively, the invention may comprise various other systems and methods.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF PREFERRED EMBODIMENTS

Figure 1:
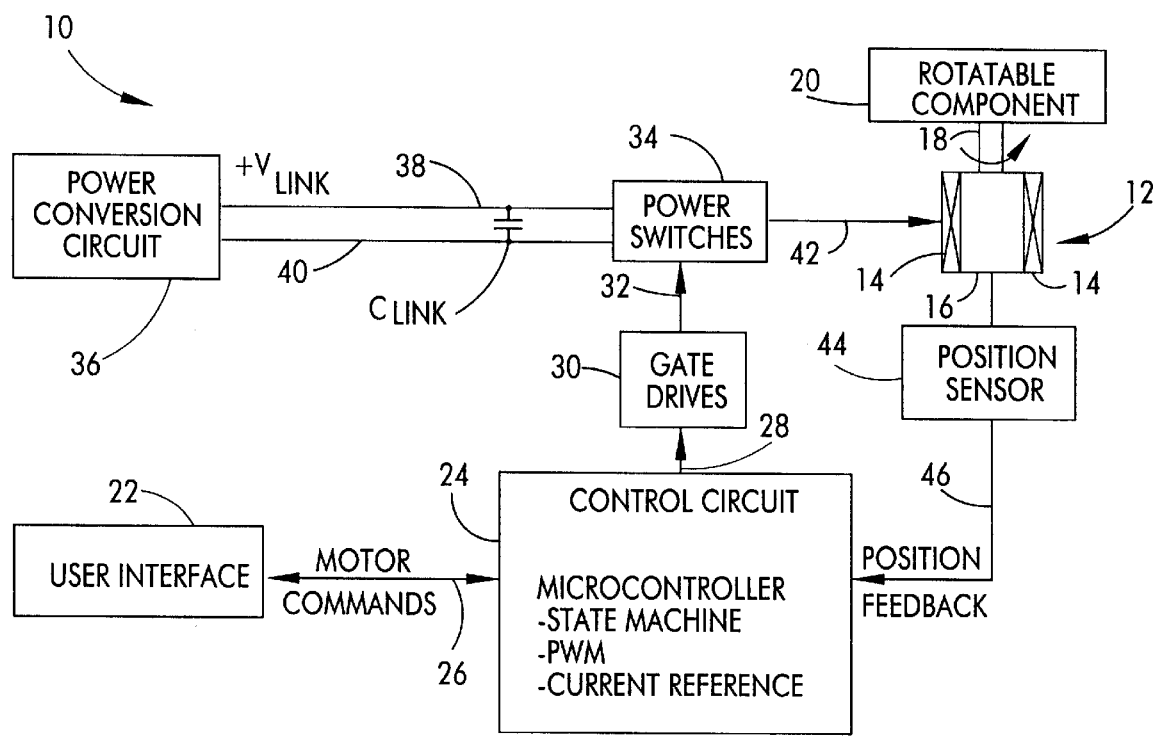
FIG. 1 is a block diagram of a motor system according to a preferred embodiment of the invention.

Referring now to FIG. 1, a motor system, generally indicated at 10, embodies aspects of the present invention. The system 10 includes a motor, generally indicated at 12, which has a stationary assembly, or stator, 14 and a rotatable assembly, or rotor, 16 in magnetic coupling relation to the stator 14. As an example, motor 12 is an electronically commutated or brushless motor which has permanent magnets mounted on its rotor 16. As is known in the art, the stator 14 of such a motor has a plurality of teeth and one or more wire-wound coils, or windings, on the teeth. The winding or windings on stator 14, when energized with current, interact with the permanent magnet rotor 16 to produce positive or negative torque, depending on the direction of the current relative to the polarity of the magnets. An electronic inverter bridge typically controls energization of the motor windings for controlling the direction and amount of torque produced by motor 12.

In the embodiment described herein, the motor 12 is a single phase, electronically commutated permanent magnet motor. For example, commonly assigned U.S. Pat. No. 5,838,127 the entire disclosure of which is incorporated herein by reference, describes a motor and control with which the present invention is suitable for use. It is to be understood, however, that aspects of the present invention may be applied to any electronically controllable motor or dynamoelectric machine typically powered by an electronic control circuit. Such motors include, for example, external rotor motors (i.e., inside out motors), permanent magnet motors, single and variable speed motors, selectable speed motors having a plurality of speeds, brushless DC motors, electronically commutated motors, switched reluctance motors and induction motors. In addition, the motors may be multi-phase or single phase motors and, in any case, such motors may have a single split phase winding or a multi-phase winding. Such motors may also provide one or more finite, discrete rotor speeds selected by an electrical switch or other control circuit.

In a preferred embodiment of the invention, a motor shaft 18 mechanically connects rotor 16 to a particular device to be driven, such as a rotatable component 20. For example, the rotatable component 20 comprises a fan, blower, compressor or the like for use in a heating, ventilating and air conditioning system or a refrigeration system. Although motor 12 is particularly useful for driving a fan, it is to be understood that motor 12 may be part of a number of different systems for driving other rotatable components. For example, rotatable component 20 may be an agitator and/or basket of a washing machine. In addition, rotatable component 20 may also include a connection mechanism for coupling it to the shaft 18. For example, commonly assigned U.S. Pat. Nos. RE 33,655, 5,492,273, 5,423,192, 5,418,438 and 5,376,866, the entire disclosures of which are incorporated herein by reference, describe various rotatable components which motor system 10 of the present invention is suited for driving.

A user interface, or system control, 22 preferably provides system control signals to a control circuit 24 via line 26. In one embodiment, the user interface 22 is a thermostat and the system control signals take the form of motor commands representing, for example, turn on and turn off commands, desired fan speed commands and the like. In response to the system control signals, the control circuit 24 then generates motor control signals. As represented by the block diagram of FIG. 1, control circuit 24 provides the motor control signals via line 28 for electronically controlling a plurality of gate drives 30. In turn, the gate drives 30 provide drive signals via line 32 for switching a plurality of power switches 34 (e.g., insulated gate bipolar transistors, bipolar junction transistors or metal oxide silicon field effect transistors). In addition to providing sufficient voltage (e.g., 15 volts) for driving the power switches 34, gate drives 30 also condition the signals provided by control circuit 24 for optimal operation of power switches 34. In a preferred embodiment of the invention, control circuit 24 is embodied by a microprocessor or microcontroller and/or an application specific integrated circuit (ASIC) or universal electronically commutated motor integrated circuit (UECM IC).

Referring further to FIG. 1, a power conversion circuit 36 provides high voltage DC power (e.g., 200–300 volts) to power switches 34 via lines 38, 40. In turn, power switches 34 selectively switch the lines 38, 40 in connection with the motor winding of stator 14. A line 42 represents the connection between power switches 34 and the motor winding. In this manner, power conversion circuit 36 supplies power to motor 12 via power switches 34. Preferably, power switches 34 are responsive to control circuit 24 for causing the motor winding to be energized in a preselected sequence for commutating motor 12. In this instance, control circuit 24 selectively activates power switches 34 to control rotation in motor 12 as a function of the motor control signals. It is to be understood that power conversion circuit 36 may also provide power to operate control circuit 24.

As an example, an inverter bridge embodies power switches 34 for driving motor 12. The inverter bridge includes a number of power switching devices (i.e., power switches 34) with a flyback diode coupled to each of the devices and is used to selectively connect the winding of motor 12 to power conversion circuit 36. If motor 12 is a single phase motor, a preferred inverter bridge has two lower switches and two upper switches that form the arms of an H-bridge configuration wherein the cross-piece of the H is the winding. Commonly assigned U.S. Pat. No. 5,859,519 the entire disclosure of which is incorporated herein by reference, describes a gate drive for driving the inverter bridge circuit of a single phase electronically commutated motor.

The inverter bridge circuit has an upper, or positive, rail (i.e., line 38) and a negative, or lower, rail (i.e., line 40) supplied by power conversion circuit 36. A shunt resistor, current transformer, Hall-effect current sensor, integrated current sensor or other sensor or circuit known in the art may be used to sense the winding, or motoring, current of motor 12. In this embodiment, rails 38, 40, in combination with a link capacitor $C_{LINK}$, constitute a power supply link, also referred to as a DC link, for providing DC power to the motor winding of stator 14. Commonly assigned U.S. Pat. No. 5,513,058, the entire disclosure of which is incorporated herein by reference, discloses a preferred DC link circuit for an electronically commutated motor.

FIG. 1 also illustrates the relationship between motor 12 and a position sensor 44. The position sensor 44 provides control circuit 24 with feedback via line 46 which is representative of the angular position of rotor 16 relative to stator 14. For example, position sensor 44 comprises one or more Hall sensors providing a rotor position feedback signal. In general, the position signal has a predefined angular relationship relative to the back electromotive force (EMF) of motor 12 (e.g., either in phase or approximately 90° out of phase with the back EMF). Other position sensors, such as optical sensors, may also be used to provide rotor position feedback instead of or in addition to the Hall sensors. For example, commonly assigned U.S. Pat. No. 5,796,194 the entire disclosure of which is incorporated herein by reference, describes a quadrature winding suitable for generating a position signal in a single phase motor such as motor 12.

Preferably, control circuit 24 generates the motor control signals as a function of the zero crossings of the back EMF of the motor winding. In this instance, the product of the current and the back EMF determines torque production in motor 12. By energizing the winding when the back EMF has crossed zero in the direction that will oppose the voltage energizing it, motor 12 sustains positive torque. Since it is desired that motor current crosses zero at the time the motor back EMF also crosses zero, control circuit 24 preferably commutates motor 12 at an angle relative to the next back EMF zero crossing. In other words, control circuit 24 estimates subsequent back EMF zero crossings based on the sensed position of rotor 16 and generates gate drive signals at line 32 for driving power switches 34 coincident with or in advance of the estimated back EMF zero crossings. Thus, control circuit 24 generates the motor control signals as a function of the sensed position of rotor 16 as represented by the position signal. As an example, commonly assigned U.S. Pat. No. 5,423,192 describes one preferred means for detecting zero crossings.

In operation, control circuit 24 implements a state machine in response to the system control signals for generating motor control signals that define desired commutation intervals. When power switches 34 are switched in response to the motor control signals, system 10 produces a motor current that matches the load torque demand as a function of a regulated current reference level. The current in the motor winding produces an electromagnetic field for rotating the rotor 16 of motor 12. By matching torque load with produced torque, motor 12 is able to operate at a desired torque or speed. System 10 controls the speed of rotatable component 20 by controlling the power delivered to the load via power switches 34 which controls the speed of motor 12. In particular, system 10 regulates current in motor 12, which in turn regulates torque, to obtain the desired motor speed by matching the load and motor loss demand torque at the desired speed.

Preferably, control circuit 24 selects one of the active power switches 34 for use in controlling the motor current. The control signals include, for example, a series of pulse width modulated cycles, wherein each cycle causes a corresponding switching event of the selected switch. In a preferred embodiment, the selected switch performs pulse width modulation of the power applied to the winding to control the motor current during any given commutation interval. Commonly assigned U.S. Pat. No. 4,757,603, the entire disclosure of which is incorporated herein by reference, shows an exemplary PWM control of a motor. Commonly assigned U.S. Pat. No. 5,675,231 the entire disclosure of which is incorporated herein by reference, discloses a system for regulating motoring current and controlling circulating currents in a single phase motor.

Figure 2A:
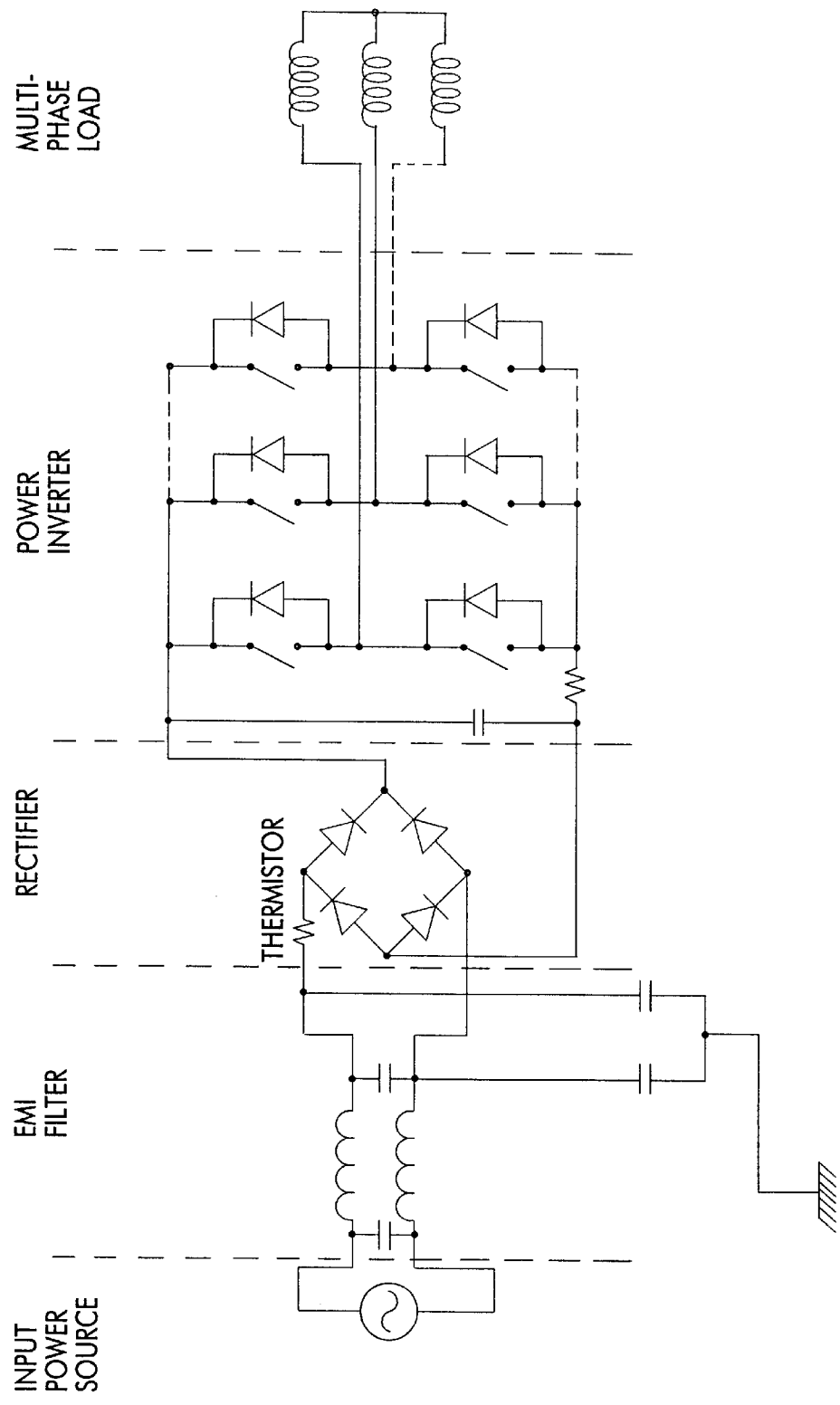
FIG. 2A is a schematic diagram of a power conversion circuit for supplying power to a motor according to the prior art.
Figure 2B:
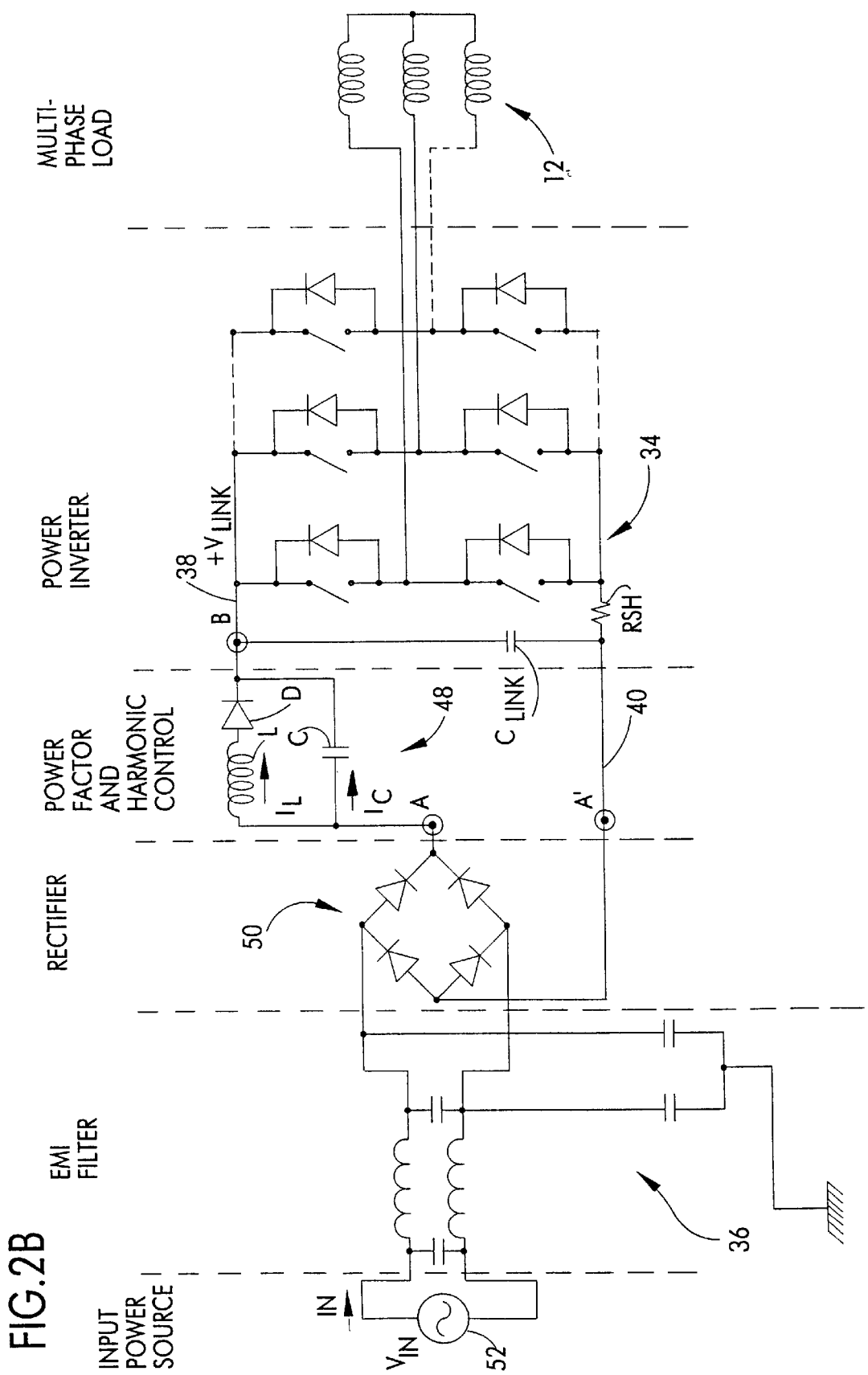
FIG. 2B is a schematic diagram of a power conversion circuit, including a power factor correction circuit, for supplying power to the motor of FIG. 1 according to a preferred embodiment of the invention.

FIG. 2A illustrates a typical power conversion circuit for supplying rectified power to a multi-phase load. In contrast, FIG. 2B illustrates one preferred embodiment of power conversion circuit 36 which includes a power factor correction circuit 48 providing passive power factor correction and harmonic control. The power factor correction circuit 48 is preferably for use with circuits that rectify and filter an AC voltage, such as power conversion circuit 36. In this embodiment, power factor is defined by the following equation:

$$PF=(V_S I_{S1}/V_S I_S)\cos\phi_1=(I_{S1}/I_S)\cos\phi_1$$

where $V_S$ and $I_S$ are the line voltage and line current, respectively; $I_{S1}$ is the RMS current at the fundamental frequency; and $\phi_1$ is the angle by which $I_{S1}$ lags $V_S$.

In this embodiment, power conversion circuit 36 includes a rectifier circuit, generally indicated at 50, which receives an AC voltage $V_{IN}$ from a voltage source 52. As shown in FIG. 2B, the rectifier circuit 50 (e.g., a bridge rectifier) has a pair of leads connected to the voltage source 52. In turn, rectifier circuit 50 rectifies the AC voltage $V_{IN}$ for use by motor 12. Power factor correction circuit 48 is electrically connected in series between a node A at the output of rectifier circuit 50 and a node B on upper rail 38. In FIG. 2B, the input current from voltage source 52 to rectifier circuit 50 is designated $I_{IN}$.

In a preferred embodiment of the invention, the power factor correction circuit 48, which includes an inductor L, a diode D and a capacitor C, is inserted in the DC link between the power rectifier circuit 50 and the motor load. The voltage source 52 injects the line input current $I_{IN}$ into circuit 48, through the capacitor C (shown as a current $I_C$ in FIG. 2B) into the DC link capacitor $C_{LINK}$ before a current $I_L$ starts building up in the inductor L. The diode D in series with inductor L prevents current reversal in inductor L and supplies a path to transfer energy to capacitor C as the current $I_C$ decays towards zero.

Figure 3:
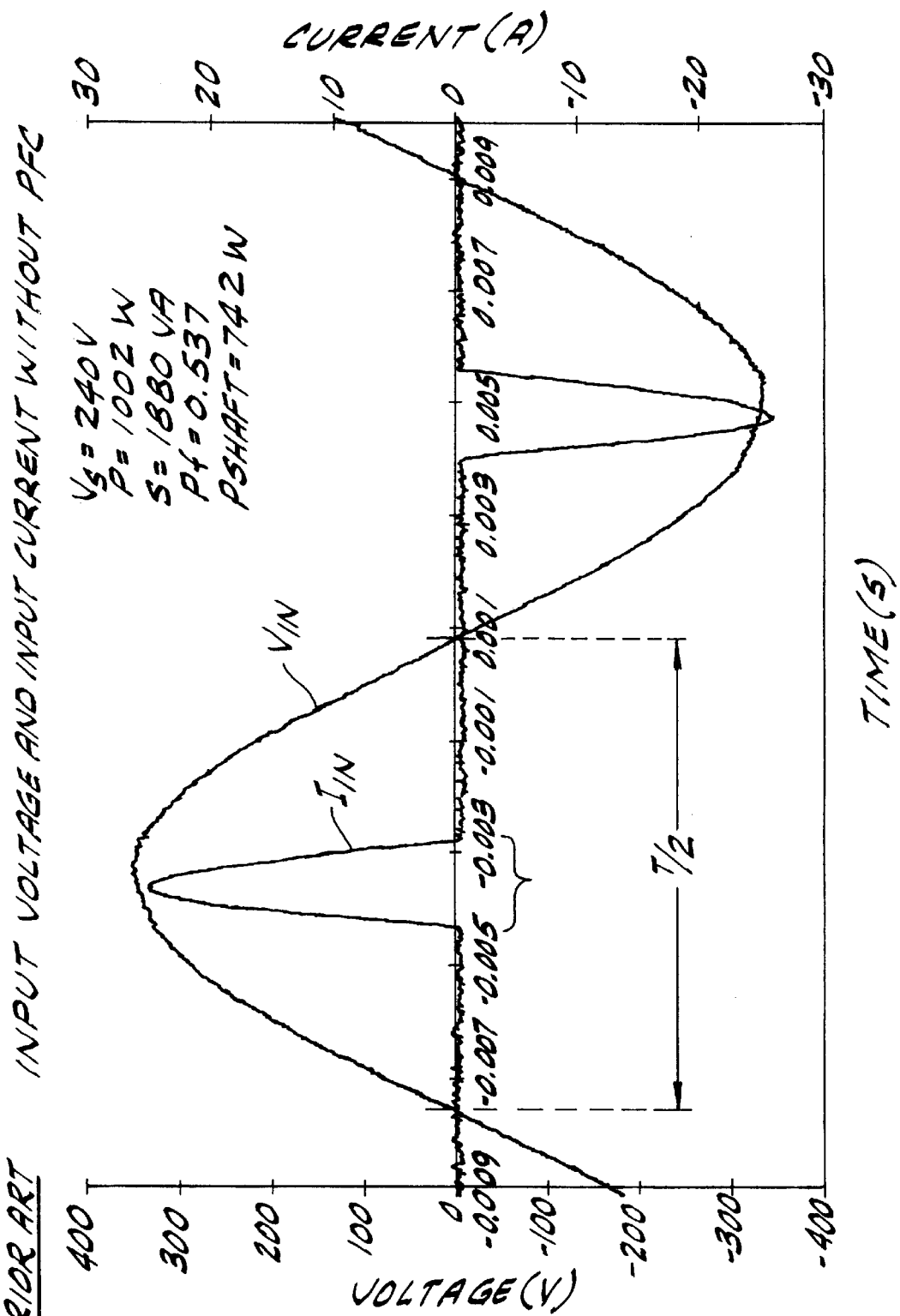
FIG. 3 illustrates exemplary supply voltage and current waveforms for the power conversion circuit of FIG. 2A.

For comparison, FIG. 3 illustrates exemplary supply voltage and current waveforms, respectively, for an AC voltage rectifier power supply which does not employ power factor correction circuit 48. As shown in FIG. 3, a portion of the input current waveform $I_{IN}$ indicated at reference character 56 represents a conduction interval. In this instance, the conduction interval 56 is relatively narrow with respect to a half-cycle of the waveform. As a result, the power factor is lower than desired. In this example, the current and voltage waveforms correspond to a motor operating at 80 oz-ft of torque and 1050 rpm.

Figure 4A:
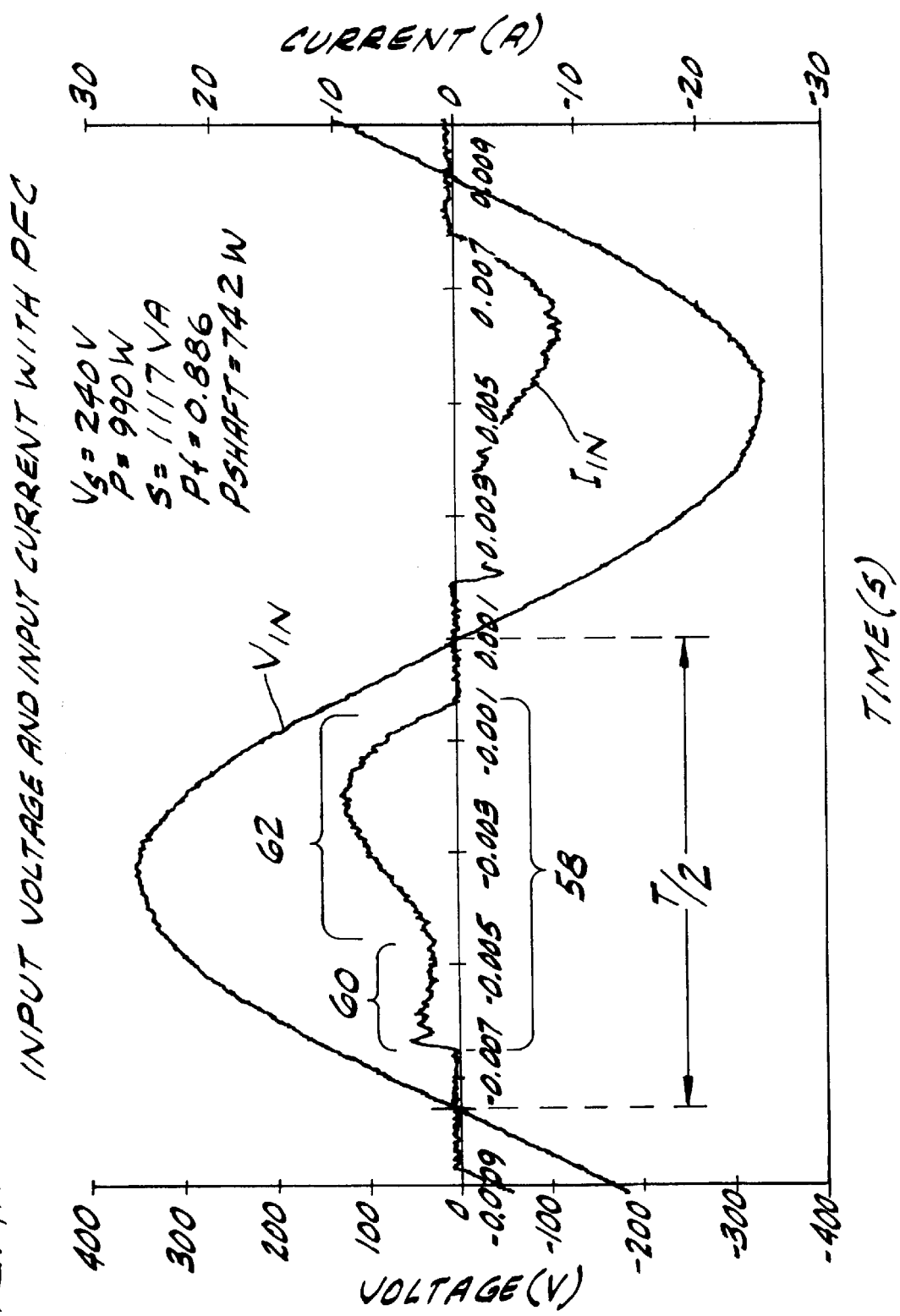
FIGS. 4A–4C are illustrations of exemplary supply voltage and current waveforms and component current waveforms for the power conversion circuit of FIG. 2B.

In contrast to FIG. 3, FIG. 4A illustrates exemplary supply voltage and current waveforms, respectively, for power conversion circuit 36. In this instance, power factor correction circuit 48 widens the conduction interval of the input current waveform $I_{IN}$, represented by a portion 58 of the waveform. Since the conduction interval 58 is relatively wide with respect to a half-cycle of the waveform, the power factor improves by becoming closer to unity. As shown in FIG. 4A, a portion of the input current waveform indicated at reference character 60 is primarily the capacitive component of the current. Likewise, another portion of the waveform indicated at reference character 62 is primarily the inductive component of the current.

Figure 4B:
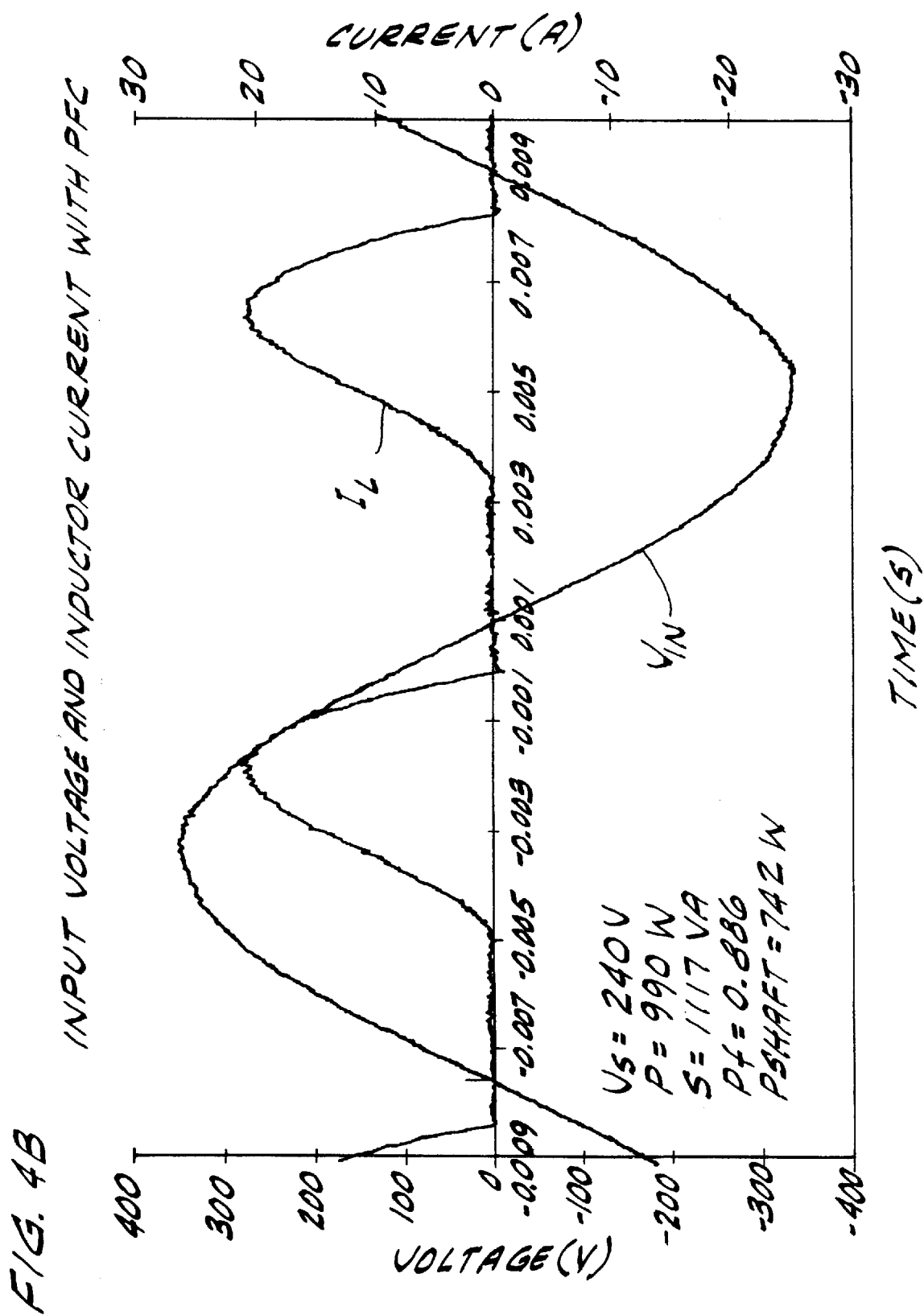
Figure 4C:
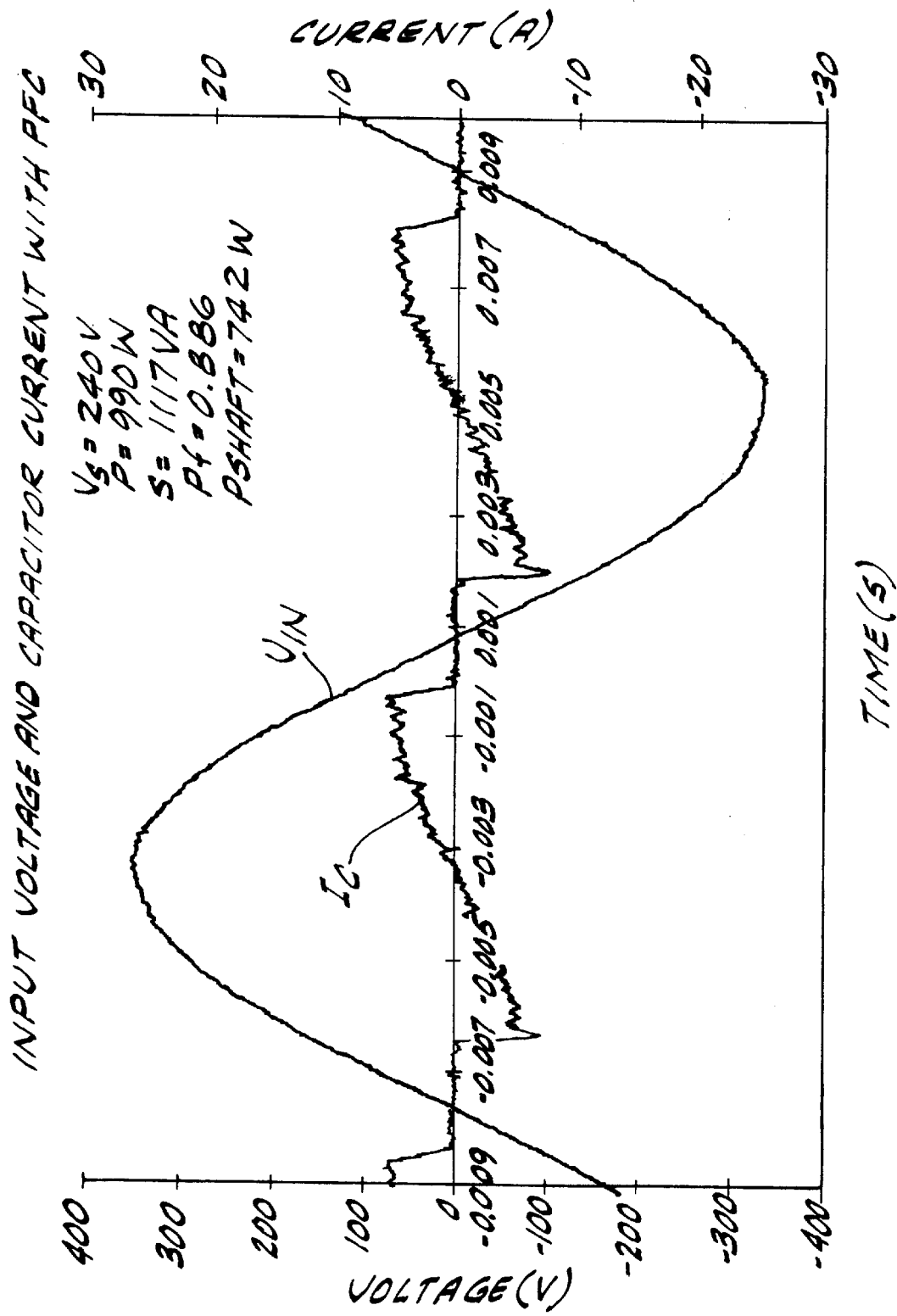

In addition, FIGS. 4B and 4C illustrate exemplary capacitor current $I_C$ and inductor current $I_L$ waveforms, respectively, for the voltage and current waveforms of FIG. 4A.

The effect of the inductor-diode combination of power factor correction circuit 48 is that the input current conduction interval 58 is increased which, in turn, increases power factor. In other words, the resonant elements of power factor correction circuit 48 (i.e., inductor L and capacitor C) store energy with the purpose of extending the conduction interval of the AC source voltage in a passive manner. Also, the shape of the input current waveform and its harmonic content is set by the value of inductor L and capacitor C. As a result, the harmonic content of the current waveform can be determined by proper selection of components to meet a given harmonic profile (e.g., IEC 555-2 or IEC 1000 which replaces IEC 555-2). In the example of FIGS. 4A–4C, motor 12 is a 1 hp electronically commutated three-phase motor wherein the value of inductor L is 12 mH and the value of capacitor C is 23 µF.

The following Table I illustrates odd harmonics on the input current waveform with and without power factor correction circuit 48 for a motor operating at 80 oz-ft of torque and 1050 rpm as compared with the specification limits of IEC 555-2. As shown, the power factor correction circuit 48 satisfies the IEC 555-2 limits.

TABLE I

|          | I3    | I5    | I7    | I9    | I11   | I13   | I15   |
|----------|-------|-------|-------|-------|-------|-------|-------|
| W/O PFC  | 3.942 | 3.400 | 2.800 | 2.100 | 1.340 | 0.719 | 0.247 |
| W/ PFC   | 1.700 | 0.828 | 0.462 | 0.091 | 0.103 | 0.168 | 0.129 |
| 555-2    | 2.150 | 1.140 | 0.770 | 0.400 | 0.330 | 0.210 | 0.150 |

TABLE I-continued

|  | I17 | I19 | I21 | I23 | I25 | I27 |
|---|---|---|---|---|---|---|
| W/O PFC | 0.137 | 0.271 | 0.291 | 0.225 | 0.117 | 0.018 |
| W/ PFC | 0.046 | 0.076 | 0.095 | 0.069 | 0.032 | 0.072 |
| 555-2 | 0.132 | 0.118 | 0.107 | 0.098 | 0.090 | 0.083 |

|  | I29 | I31 | I33 | I35 | I37 | I39 |
|---|---|---|---|---|---|---|
| W/O PFC | 0.074 | 0.110 | 0.103 | 0.068 | 0.020 | 0.026 |
| W/ PFC | 0.074 | 0.047 | 0.037 | 0.061 | 0.050 | 0.044 |
| 555-2 | 0.078 | 0.073 | 0.068 | 0.064 | 0.061 | 0.058 |

As a further example, the following Table II shows measurements on power factor for a ½ hp motor at 42 oz-ft of torque and 1050 rpm. The first row of measurements in Table II are representative of a power supply circuit which does not include power factor correction circuit 48 according to the present invention (e.g., see the circuit of FIG. 2A). The second and third rows of measurements are representative of power conversion circuit 36 of FIG. 2B which includes power factor correction circuit 48 having the values for capacitor C shown below.

TABLE II

| C ($\mu$F) | L (mH) | Power Factor | Average Power (W) | Apparent Power (VA) | Input Current (A) |
|---|---|---|---|---|---|
| 0 | 0 | 0.52 | 576 | 1108 | 4.6 |
| 23 | 6 | 0.783 | 533 | 681 | 2.96 |
| 50 | 6 | 0.835 | 542 | 649 | 2.83 |

In this instance, the LC circuit of power factor correction circuit 48 is exposed to twice the line frequency of the AC voltage source 52 (e.g., $^{50}$⁄₆₀ Hz) when placed after a full wave rectifier such as rectifier circuit 50. The line frequency sets the operating frequency of power factor correction circuit 48 and, in turn, the resonant frequency of the LC components sets the shape of the current waveform. Preferably, the values of the LC components are selected so that the LC circuit of power factor correction circuit 48 resonates at a frequency between the third and fifth harmonics of the supply voltage $V_{IN}$. The power factor correction circuit 48 improves power factor and harmonic content of a rectified power supply supplying a DC link (i.e., power conversion circuit 36). Although this passive circuit 48 achieves less than unity power factor in these examples, it improves the power factor significantly without switching losses and the like associated with a soft or hard switching active converter. The following Table III shows the odd harmonics of the first nine harmonics on the input current waveform. The power factor correction circuit 48 with component values of the first and second rows of measurements (from Table II) are compared with the specification limits of IEC 1000. As shown, the power factor correction circuit satisfies the IEC 1000 limits.

TABLE III

| C ($\mu$F) | L (mH) | I1 | I3 | I5 | I7 | I9 |
|---|---|---|---|---|---|---|
| 0 | 0 | 2.586 | 2.399 | 2.087 | 1.68 | 1.24 |
| 23 | 6 | 2.325 | 1.567 | 0.903 | 0.569 | 0.126 |
| IEC 1000 Limit | | | 2.3 | 1.14 | 0.77 | 0.4 |

One known circuit for improving the power factor of a rectified power supply includes a capacitor connected across the supply's bridge rectifier connections to the DC link (e.g., across nodes A and A' in FIG. 2B). In addition to such a capacitor, this known circuit includes a series combination of an inductor and diode connected between the capacitor and the DC link (e.g., between nodes A and B in FIG. 2B). Essentially, the conventional power factor correction circuit, as a whole, is connected in parallel to the DC link and the voltage across its capacitor is the full rectified voltage.

An advantage of power factor correction circuit 48 over the known art is that the operating voltage across capacitor C is lower than the operating voltage across a capacitor connected across the supply's rectifier. Another advantage is that power factor correction circuit 48 can be easily implemented on an existing product. For example, two interconnections (i.e., node A at the output 54 of rectifier circuit 50 and node B on upper rail 38) are used to insert power factor correction circuit 48 in upper rail 38. The parallel arrangement of the known circuit described above requires two interconnections in the upper rail and another interconnection in the lower rail which prevents it from being easily retrofitted to existing motor system designs. Further, power factor correction circuit 48 can be optimized for maximum power factor or to meet a given harmonic current profile by proper selection of the values of inductor L and inductor C.

In operation, the voltage source 52 injects the line input current $I_{IN}$ through the capacitor C (shown as a current $I_C$ in FIG. 2B) into the DC link capacitor $C_{LINK}$ before the amplitude of the input voltage $V_{IN}$ reaches the amplitude of the DC link voltage (i.e., the voltage across $C_{LINK}$ shown as $V_{LINK}$ in FIG. 2B). The output voltage of the DC link varies with the value of capacitor C. In contrast to capacitor current $I_C$, the current $I_L$ starts building up in the inductor L when the input voltage $V_{IN}$ reaches the amplitude of the DC link voltage $V_{LINK}$. The amplitude of the current $I_C$ depends on the energy stored in capacitor C during the previous cycle of the input voltage $V_{IN}$. The diode D in series with inductor L prevents current reversal in inductor L and supplies a path for energy storage in capacitor C as the inductor current $I_L$ decays towards zero. Also, the presence of diode D substantially eliminates oscillations of the LC circuit combination formed by inductor L and capacitor C. As a result, power factor correction circuit 48 effectively increases the input current conduction interval 58 which impacts power factor and provides harmonic control.

In addition, power factor correction circuit 48 eliminates the need for inrush current protection. For example, in circuits involving voltage source inverters, a negative temperature coefficient thermistor is often provided in series with the power buses before the DC capacitor to limit the initial current when power is applied and the DC link capacitor is totally discharged. Advantageously, a motor system according to the invention eliminates the need for such a thermistor circuit.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A motor system comprising:
   a rotatable assembly;
   a stationary assembly in magnetic coupling relation to the rotatable assembly, said stationary assembly including a winding;

a power supply link having an upper rail and a lower rail for supplying power to the winding; and a power conversion circuit connected to an AC voltage source for supplying power to the power supply link, said power conversion circuit comprising:

a rectifier circuit for rectifying the AC voltage, said rectifier circuit having first and second outputs corresponding to the upper and lower rails of the power supply link, respectively; and a passive power factor correction circuit connected directly between the first output of the rectifier circuit and a node of the corresponding upper rail of the power supply link for improving the power factor of the power supplied to the winding, said power factor correction circuit including an inductor and a diode connected in series with each other to form an inductor combination and a capacitor connected in parallel with the inductor-diode combination.

2. The system of claim 1 wherein the power factor correction circuit comprises a passive electric network.

3. The system of claim 1 wherein the power supply link includes a link capacitor connected between the upper rail and the lower rail defining a link voltage thereacross, said link voltage being greater than a voltage across the capacitor of the power factor correction circuit.

4. The system of claim 1 wherein the power supply link includes a link capacitor connected between the upper rail and the lower rail and wherein the power factor correction circuit is connected to the link capacitor at the node of the corresponding upper rail of the power supply link.

5. The system of claim 1 further comprising an inverter bridge circuit including a set of upper power switches connected between the upper rail and the winding and a set of lower power switches connected between the winding and the lower rail, each of said lower switches corresponding to one of said upper switches, said switches each having a conducting state and a nonconducting state for selectively connecting the rails of the power supply link to the winding whereby the winding is energized to produce an electromagnetic field for rotating the rotatable assembly relative to the stationary assembly.

6. The system of claim 5 further comprising a control circuit for generating a motor control signal to control the switches as a function of a desired speed and/or torque of the motor.

7. The system of claim 1 further comprising a shaft in driving relation with the rotatable assembly for driving a rotatable component.

8. A power conversion circuit for a motor, said motor having a stationary assembly including a winding and a rotatable assembly in magnetic coupling relation to the stationary assembly, said motor also having a power supply link having an upper rail and a lower rail for supplying power to the winding, said power conversion circuit comprising:

a pair of leads for connecting the power conversion circuit to an AC voltage source to supply power to the power supply link;

a rectifier circuit for rectifying the AC voltage supplied by the AC voltage source, said rectifier circuit having first and second outputs corresponding to the upper and lower rails of the power supply link, respectively; and a passive power factor correction circuit connected directly between the first output of the rectifier circuit and a node of the corresponding upper rail of the power supply link for improving the power factor of the power supplied to the winding, said power factor correction circuit including an inductor and a diode connected in series with each other to form an inductor combination and a capacitor connected in parallel with the inductor-diode combination.

9. A method of improving power factor and controlling harmonic content of power supplied to a motor, said motor having a stationary assembly including a winding and a rotatable assembly in magnetic coupling relation to the stationary assembly, said motor also having a power supply link having an upper rail and a lower rail for supplying power to the winding, said method comprising the steps of:

connecting a rectifier circuit between a power supply and the power supply link, said rectifier circuit rectifying an AC voltage supplied to the power supply link by the power supply, said rectifier circuit having first and second outputs corresponding to the upper and lower rails of the power supply link, respectively; and connecting a passive power factor correction circuit directly between the first output of the rectifier circuit and a node of the corresponding upper rail of the power supply link for improving the power factor and controlling the harmonic content of the power supplied to the winding, said connecting the power factor correction circuit step including connecting an inductor and a diode in series with each other to form an inductor-diode combination between the first output of the rectifier circuit and the node of the corresponding upper rail of the power supply link and connecting a capacitor in parallel with the inductor-diode combination also between the first output of the rectifier circuit and the node of the corresponding upper rail of the power supply link.

10. The method of claim 9 wherein the power factor correction circuit comprises a passive electric network.

11. The method of claim 9 wherein the power supply link includes a link capacitor connected between the upper rail and the lower rail defining a link voltage thereacross, said link voltage being greater than a voltage across the capacitor of the power factor correction circuit.

12. The method of claim 9 wherein the power supply link includes a link capacitor connected between the upper rail and the lower rail and wherein the step of connecting the power factor correction circuit comprises connecting the power factor correction circuit to the link capacitor at the node of the corresponding upper rail of the power supply link.

13. The method of claim 9 further comprising an inverter bridge circuit including a set of upper power switches connected between the upper rail and the winding and a set of lower power switches connected between the lower rail and the winding, each of said lower switches corresponding to one of said upper switches, said switches each having a conducting state and a nonconducting state for selectively connecting the rails of the power supply link to the winding whereby the winding is energized to produce an electromagnetic field for rotating the rotatable assembly relative to the stationary assembly.

14. The method of claim 9 wherein the power factor of the power supplied to the motor is defined by:

$$PF=(V_S I_{S1}/V_S I_S)\cos \phi_1 = (I_{S1}/I_S)\cos \phi_1$$

where $V_S$ and $I_S$ are line voltage and line current, respectively; $I_{S1}$ is RMS current at a fundamental frequency; and $\phi_1$ is an angle by which $I_{S1}$ lags $V_S$.

* * * * *